Patented Oct. 7, 1924.

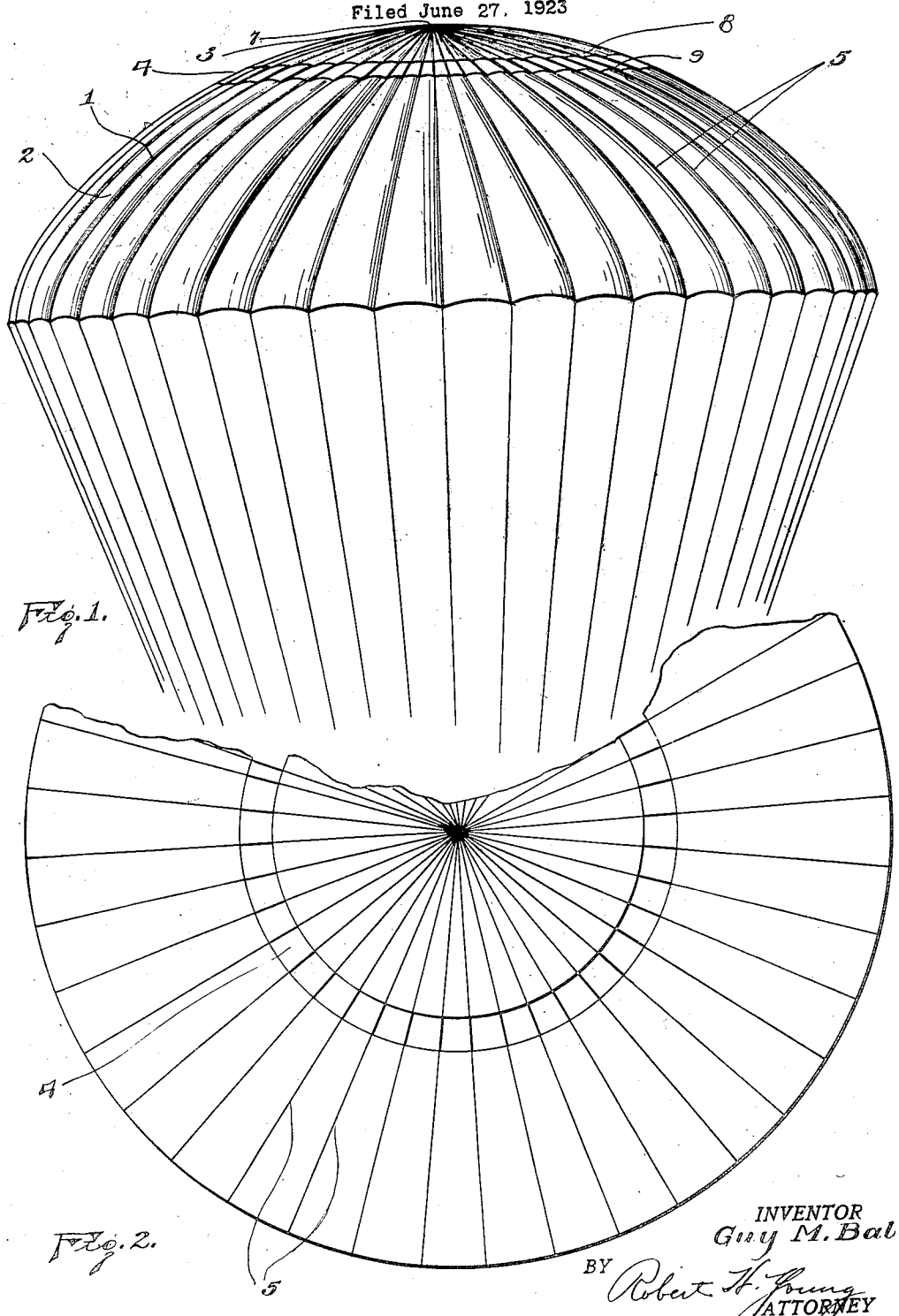

1,511,154

UNITED STATES PATENT OFFICE.

GUY M. BALL, OF DAYTON, OHIO.

PARACHUTE.

Application filed June 27, 1923. Serial No. 648,054.

*To all whom it may concern:*

Be it known that I, GUY M. BALL, a citizen of the United States, residing at Dayton, in the county of Montgomery and State of Ohio, have invented certain new and useful Improvements in Parachutes, of which the following is a specification.

This invention relates to parachutes, more particularly to those having vents for the purpose of maintaining lateral stability while in descent.

In the present type of vented parachutes, the common practice is to place a vent in the form of a centrally disposed circular aperture which is necessarily comparatively small in size, in order not to lessen the lifting surface of the whole. It is the prime object of my invention to provide a ring vent arranged concentrically adjacent to the peak of the parachute, in such a manner that the parachute as a whole will not be weakened structurally.

It is a further object to provide a parachute with a vent so that the radial reinforcing cords for the parachute connect the inner and outer portions of the parachute in such a manner that a smooth curve is defined radially at the vent.

Further objects will be more fully set forth in the attached specification and claims and in the drawings in which:

Fig. 1 is an elevational view of a parachute provided with an improved vent.

Fig. 2 is a plan view of the same, part being broken away.

Referring to the drawings by reference numerals, the parachute which is divided into a lower outer portion 2, and upper central portion 3 by means of the vent 4, interrupting the continuous surfaces of the parachute. Reinforcing cords 5 extend from the outer edge 6 to the center of the peak designated 7 in a continuous manner, and pass over the vented opening 4 so that the edges of the parachute at the vent together with the cords 5 define a smooth curve having no sudden change in direction or degree, this curve extending radially from the center peak 7.

It will be understood that by providing the vent with a shape as shown so that the outer diameter of the upper parachute portion is considerably smaller than the inner diameter of the lower portion, no extra strain will be provided on the reinforced edges 8 and 9 of the upper and lower parachute portions at the vent. Likewise, no extra strains will be provided on the cords 5 or on the fabric of the parachute itself at any point.

The ring vent is preferably used in conjunction with a closable peak vent which is shown in its closed position at 7. It is obvious that the ring vent may be provided at a point remote from the center peak and close to the outer rim of the parachute if desired. In any event, lateral stability will be maintained and this result will be obtained without in any way lessening the mechanical strength or increasing the weight in the slightest degree of the parachute itself.

I claim:

1. A parachute provided with a ring vent concentrically arranged around the center peak of the same, said vent dividing the parachute into outer and inner portions, reinforcing cords for said parachute connecting said outer and inner portions together, the diameter of the inner parachute portion at the vent being substantially smaller than the diameter of the outer portion at the vent, the lengths of the reinforcing cord extending across the vent being such that the outer and inner portions of the parachute at the vent define a line radially devoid of any very abrupt change in direction.

2. A parachute provided with a ring vent concentrically arranged around the peak, said vent dividing the parachute into outer and inner portions, radial reinforcing cords for said parachute connecting said outer and inner portions together and extending continuously from the peak to the outer diameter of the lower portion, the outer and inner portions of the parachute at the vent together with the parts of the reinforcing cords which extend across the vent, defining a smooth curve radially when the said cords are taut.

3. A parachute having a closable peak and provided with a ring vent concentrically arranged around the peak, said vent dividing the parachute into outer and inner portions, radial reinforcing cords for said parachute connecting said outer and inner portions together and extending continuously from the peak to the outer diameter of the lower portion, the outer and inner portions of the parachute at the vent together with the parts of the reinforcing cords which extend across the vent, defining a smooth curve radially when the said cords are taut.

In testimony whereof I affix my signature.

GUY M. BALL.